US012182760B2

United States Patent
Stanley et al.

(10) Patent No.: US 12,182,760 B2
(45) Date of Patent: *Dec. 31, 2024

(54) MACHINE-LEARNED MODEL FOR OPTMIZING SELECTION SEQUENCE FOR ITEMS IN A WAREHOUSE

(71) Applicant: Maplebear Inc., San Francisco, CA (US)

(72) Inventors: Jeremy Stanley, Oakland, CA (US); Montana Low, Mill Valley, CA (US); Nima Zahedi, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,575

(22) Filed: Aug. 22, 2023

(65) Prior Publication Data

US 2023/0394432 A1    Dec. 7, 2023

Related U.S. Application Data

(63) Continuation of application No. 15/882,934, filed on Jan. 29, 2018, now Pat. No. 11,775,926.

(51) Int. Cl.
| | |
|---|---|
| *G06Q 10/087* | (2023.01) |
| *G06N 3/04* | (2023.01) |
| *G06N 3/08* | (2023.01) |
| *G06N 5/01* | (2023.01) |
| *G06N 20/20* | (2019.01) |

(52) U.S. Cl.
CPC ........... *G06Q 10/087* (2013.01); *G06N 3/04* (2013.01); *G06N 3/08* (2013.01); *G06N 5/01* (2023.01); *G06N 20/20* (2019.01)

(58) Field of Classification Search
CPC .......... G06Q 10/087; G06N 3/04; G06N 3/08; G06N 5/01; G06N 20/20

(Continued)

(56) References Cited

U.S. PATENT DOCUMENTS

| | | | |
|---|---|---|---|
| 11,393,015 B1* | 7/2022 | Pinette | G01J 3/02 |
| 2008/0154720 A1 | 6/2008 | Gounares et al. | |

(Continued)

OTHER PUBLICATIONS

Nguyen, Lam Minh. A Service System with On-Demand Agents, Stochastic Gradient Algorithms and the SARAH Algorithm. Lehigh University ProQuest Dissertation & Theses, 2018. 10928943. (Year: 2018).*

(Continued)

*Primary Examiner* — Florian M Zeender
*Assistant Examiner* — Fawaad Haider
(74) *Attorney, Agent, or Firm* — Fenwick & West LLP

(57) ABSTRACT

An online shopping concierge system sorts a list of items to be picked in a warehouse by receiving data identifying a warehouse and items to be picked by a picker in the warehouse. The system retrieves a machine-learned model that predicts a next item of a picking sequence of items. The model was trained, using machine-learning, based on sets of data that each include a list of picked items, an identification of a warehouse from which the items were picked, and a sequence in which the items were picked. The system identifies an item to pick first and a plurality of remaining items. The system predicts, using the model, a next item to be picked based on the remaining items, the first item, and the warehouse. The system transmits data identifying the first item and the predicted next item to be picked to the picker in the warehouse.

20 Claims, 8 Drawing Sheets

(58) Field of Classification Search
USPC .......................................................... 705/28
See application file for complete search history.

(56) References Cited

U.S. PATENT DOCUMENTS

| | | |
|---|---|---|
| 2014/0181121 A1 | 6/2014 | Nice et al. |
| 2015/0073929 A1 | 3/2015 | Psota et al. |
| 2016/0042315 A1 | 2/2016 | Field-Darragh et al. |
| 2016/0171336 A1 | 6/2016 | Schwartz |
| 2017/0099200 A1 | 4/2017 | Ellenbogen et al. |
| 2018/0276739 A1 | 9/2018 | Chopp |
| 2019/0138978 A1 | 5/2019 | Johnson et al. |

OTHER PUBLICATIONS

Das, D. et al. "A Multi-Warehouse Partial Backlogging Inventory Model for Deteriorating Items Under Inflation When a Delay in Payment is Permissible," *Annals of Operations Research*, vol. 226, Mar. 2015, pp. 133-162.

Manhattan Associates, "Manhattan Associates Delivers First Omni-Channel-as-a-Service Platform," NASDAQ OMX's News Release Distribution Channel, New York, May 9, 2017.

Wang, J. "Improving Large-Scale Recommendation Systems with Contextual Signals," State University of New York at Buffalo, ProQuest Dissertations Publishing, Jun. 1, 2018, pp. 1-92.

United States Office Action, U.S. Appl. No. 15/882,934, filed Mar. 27, 2023, 15 pages.

United States Office Action, U.S. Appl. No. 15/882,934, filed Apr. 14, 2022, 21 pages.

United States Office Action, U.S. Appl. No. 15/882,934, filed Sep. 30, 2021, 16 pages.

United States Office Action, U.S. Appl. No. 15/882,934, filed Dec. 22, 2020, 16 pages.

United States Office Action, U.S. Appl. No. 15/882,934, filed Apr. 30, 2020, 12 pages.

United States Office Action, U.S. Appl. No. 15/882,934, filed Oct. 3, 2019, 11 pages.

\* cited by examiner

| Customer Order 400 |
|---|
| Coffee Beans |
| Bunch of Grapes |
| Frozen Pizza |
| Ear of Corn |
| Loaf of Bread |
| Chocolate Chip Cookie |
| Potato |
| Box of Spaghetti |
| Turkey Leg |
| Chocolate Bar |

| Picked Sequence 450 |
|---|
| 1. Ear of Corn |
| 2. Potato |
| 3. Bunch of Grapes |
| 4. Loaf of Bread |
| 5. Chocolate Chip Cookie |
| 6. Box of Spaghetti |
| 7. Chocolate Bar |
| 8. Coffee Beans |
| 9. Turkey Leg |
| 10. Frozen Pizza |

FIG. 4

| Order In Progress 500 ||
|---|---|
| Picked Items 510 | Remaining Items 520 |
| 1. Bunch of Bananas | Salmon |
| 2. Bunch of Grapes | Celery |
| 3. Tomato | Fresh OJ |
| | Ice Cream |
| | Frozen Pizza |
| | Carton of Eggs |

Next Item Suggested for Picking 530

FIG. 5A

| Order Received 550 |
|---|
| Salmon |
| Celery |
| Fresh OJ |
| Ice Cream |
| Frozen Pizza |
| Carton of Eggs |
| Tomato |
| Bunch of Grapes |
| Bunch of Bananas |

| Suggested Picking Sequence For Order 560 |
|---|
| Frozen Pizza |
| Ice Cream |
| Salmon |
| Carton of Eggs |
| Celery |
| Fresh OJ |
| Bunch of Grapes |
| Tomato |
| Bunch of Bananas |

FIG. 5B

MACHINE-LEARNED MODEL FOR OPTMIZING SELECTION SEQUENCE FOR ITEMS IN A WAREHOUSE

CROSS REFERENCE TO RELATED APPLICATIONS

This application is a continuation of co-pending U.S. application Ser. No. 15/882,934, filed Jan. 29, 2018, which is incorporated by reference in its entirety.

BACKGROUND

This invention relates generally to optimizing the sequence for picking items in a warehouse. More particularly, the invention relates to using a trained predictive model to identify a next item to pick in a warehouse based on a last-picked item.

In current delivery fulfilment systems, pickers fulfill orders at a physical warehouse on behalf of customers as part of an online concierge service. An online concierge system assigns lists of items to pickers, who collect the items in the warehouse. The items are then delivered by the picker or by a separate delivery driver.

Physical retailers have large and complex layouts that vary from store to store and can be confusing for the pickers to navigate. Because of variations in the store layouts, a picker who is given an unsorted list of items often will not pick all of the items in the most efficient order, and may not even be able to discern the most efficient sequence in which to pick the items. In some cases, a picker may not even know where a particular item can be found in a store. For example, some grocery stores put hummus with dairy products, while other grocery stores put hummus with deli products, or in other locations. If the picker does know where to find a product within the warehouse, the picker will be inefficient in picking the items and may fail to find one or more items on the list.

SUMMARY

Providing a sequence for picking items on a list based on where the items are likely to be found in a warehouse makes people picking the items (referred to herein as "pickers") more efficient and successful when picking the list of items. For example, if it is known that for a particular grocery store, the hummus is located in the dairy section, putting hummus directly after milk on the list would encourage the picker to look for the hummus near the milk. However, if pickers operate in many stores or other warehouses that are not controlled by the online concierge system, the online concierge system will not be able to map the warehouse layouts to determine the precise locations of all items within each warehouse. Stores do not have uniform layouts, and even within a single store, the locations of items often change over time, e.g., based on the addition or removal of products, or store reorganization. Thus, to determine picking sequences for pickers, the online concierge system uses deep learning to build a model for predicting the best sequence to pick items based on the previous behavior of pickers. The online concierge system then sorts the lists for pickers using the model. For example, the online concierge system can sort the list item-by-item by selecting a first item from the list to pick first, and then selecting in order each subsequent item from the remaining items on the list. To select each item in order, the model can predict the next item that should be picked based on the previous item or items selected from the list, the items that are still on the list, and the warehouse in which the picker is picking items.

More particularly, in some embodiments, the online concierge system performs a method for sorting a list of items to be picked in a warehouse. The online concierge system receives data identifying the warehouse and a plurality of items to be picked by a picker in the warehouse. The online concierge system retrieves a machine learned model that predicts a next item of a picking sequence of items. The model has been trained, using machine-learning, based on sets of data. Each set of data includes a list of picked items, an identification of a warehouse from which the picked items were picked, and a sequence in which the picked items in the list were picked. The online concierge system identifies a first item of the plurality of items to be picked first, and a plurality of remaining items of the plurality of items to be picked. Using the retrieved model, the online concierge system predicts the next item of the plurality of items to be picked based on the plurality of remaining items, the first item, and the warehouse. The online concierge system transmits data identifying the first item and the predicted next item to the picker in the warehouse.

BRIEF DESCRIPTION OF THE DRAWINGS

FIG. 4 illustrates a list of items selected by a customer and a sequence in which the items were picked by a picker, according to one embodiment.

FIG. 5A illustrates a list of items of an order in progress and a suggested item for picking next, according to one embodiment.

FIG. 5B illustrates a list of items in a received order and a suggested picking sequence for the full order, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment of an Online Concierge Platform

Figure 1:
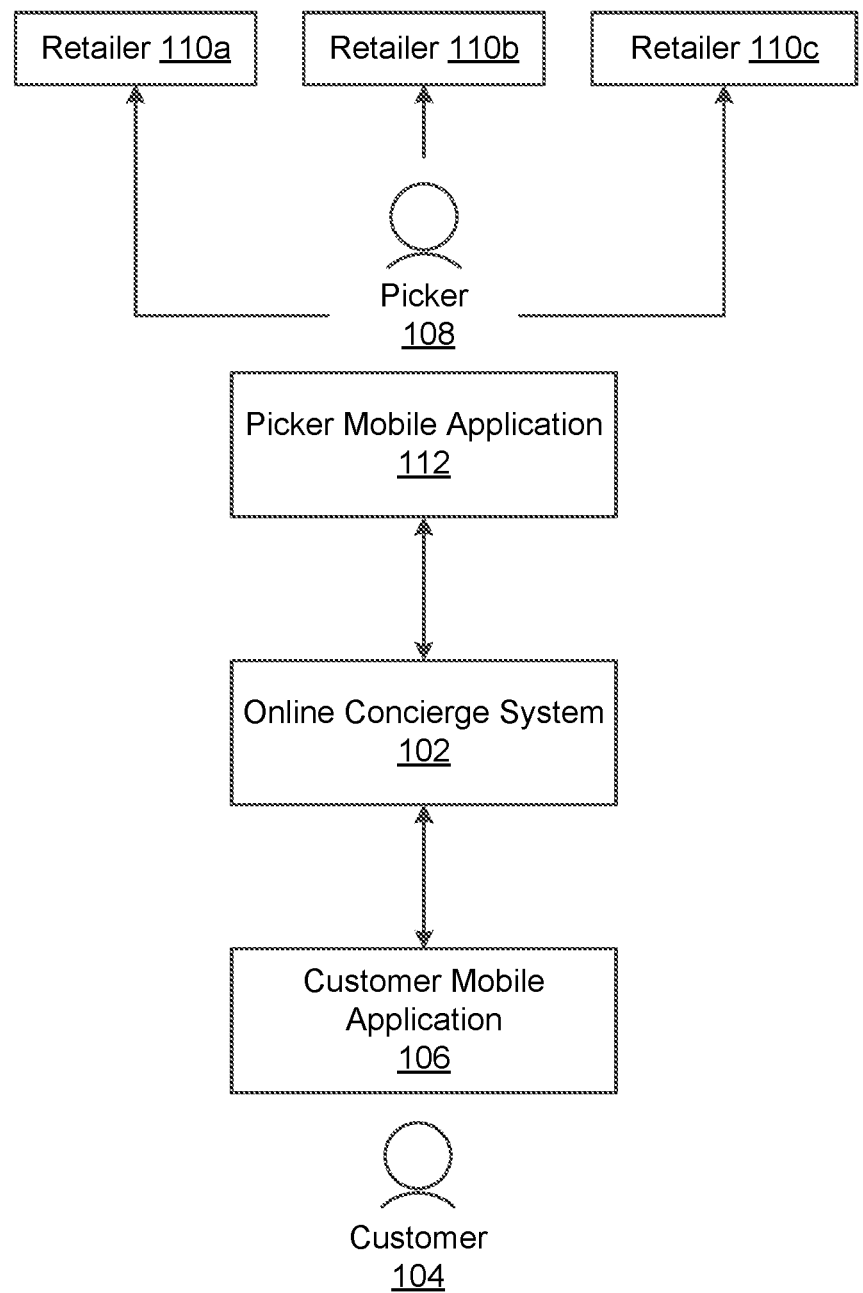
FIG. 1 illustrates an environment of an online concierge platform, according to one embodiment.

FIG. 1 illustrates the environment 100 of an online concierge platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application 112 which is configured to interact with the online concierge system 102.

Online Concierge System

Figure 2:
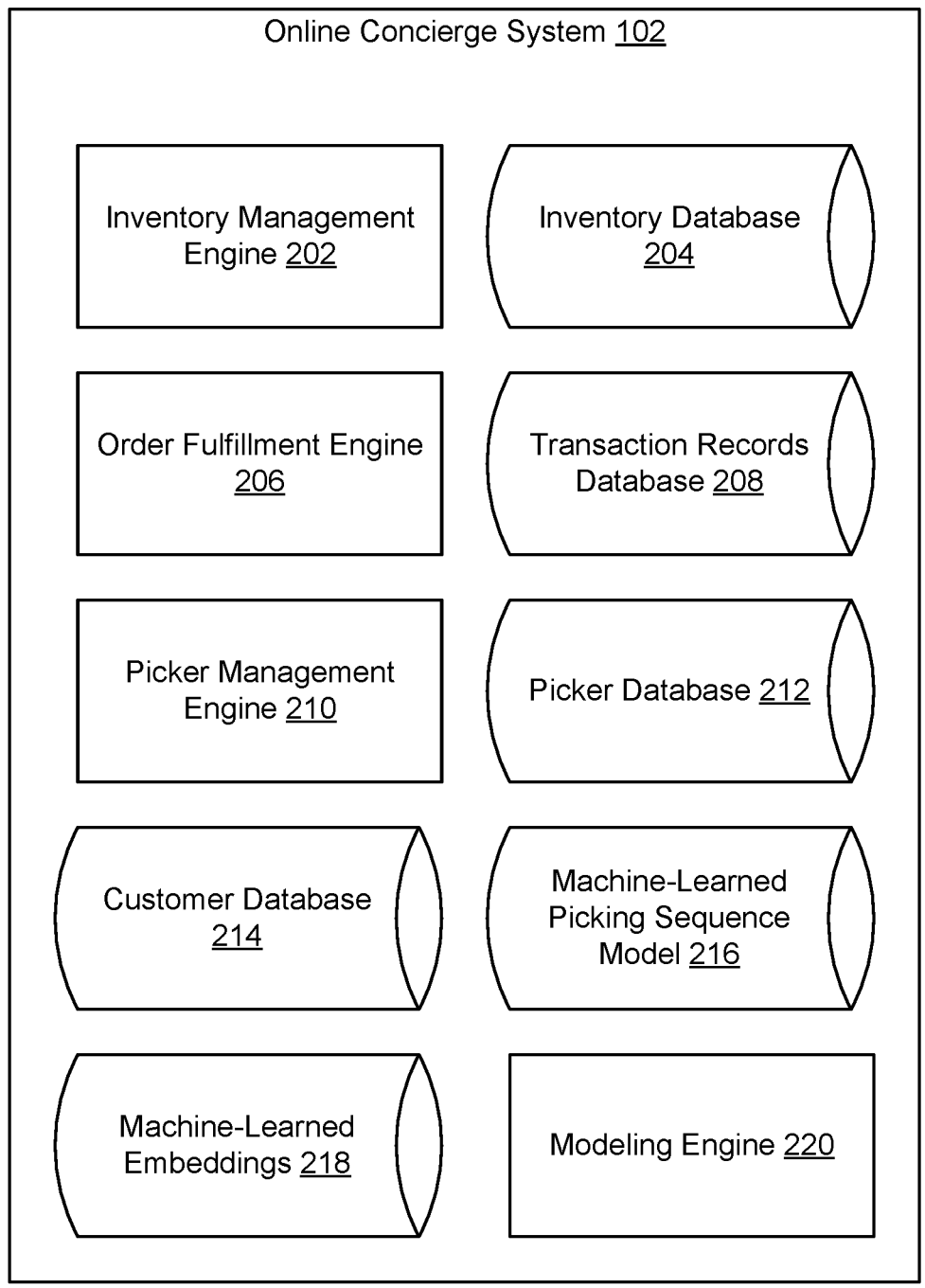
FIG. 2 is a diagram of an online concierge system, according to one embodiment.

FIG. 2 is a diagram of an online concierge system, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouses 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouse 110. For example, after successful fulfillment of an order, the order fulfillment engine 206 may transmit a summary of the order to the appropriate warehouse. The summary may indicate the items purchased, the total value of the items, and in some cases, an identity of the picker 108 and customer 104 associated with the transaction. In one embodiment, the order fulfillment engine 206 pushes transaction and/or order details asynchronously to warehouse systems. This may be accomplished via use of webhooks, which enable programmatic or system-driven transmission of information between web applications. In another embodiment, warehouse systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse 110 to fulfill the order based on one or more parameters, such as the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

The picker management engine 210 uses a machine-learned picking sequence model 216 to determine a next item from the remaining items in an order for the picker 108 to pick, or a sequence for the picker 108 to pick the items in the order. The picking sequence model 216 is a predictive model that identifies a next item that a picker should pick, given the warehouse 110, the remaining items, and a previous item (e.g., the last item that the picker 108 picked, or the last item that the picking sequence model 216 identified). Additional inputs to the picking sequence model 216 can be used, e.g., time of day, day of week, retailer identifier, additional warehouse information (e.g., layout information), and additional product information (e.g., brand, description, category). The picker management engine 210 can sort a list of items by repeatedly applying the picking sequence model 216 to the items, e.g., by predicting a first item, then predicting a second item to pick after the predicted first item, then predicting a third item to pick based on the predicted second item, and so forth. In some embodiments, a second picking sequence model is used to predict a first item based on the warehouse 110 and the list of items; in other embodiments, the same picking sequence model 216 is used to predict both a first item and subsequent items. The predictive model may predict the next item or sequence of items that a generic or optimal picker, acting efficiently, would pick. This may be considered an optimal next item or optimal sequence. Alternatively, if the predictive model is trained to consider a picker's habits, the predictive model may predict the next item that a sequence of items that a specific picker 108, acting efficiently, would pick. The picking sequence model 216 may be a neural network trained to determine an optimized picking sequence.

After the picking sequence model 216 determines the next item or picking sequence, the picker management engine 210 transmits the determined next item or the determined sequence to the picker 108, e.g., by sorting the list of items according to the determined picking sequence, or by transmitting only the next item for picking next to the picker 108. In some embodiments, while a picker 108 is picking items for an order at the warehouse 110, the picker management engine 210 can track the items that have been picked by the picker 108 and, using the machine-learned picking sequence model 216, identify one or more items that the picker 108 should pick next. In other embodiments, the online concierge system 102 transmits the machine-learned picking sequence model 216 to the picker mobile application 112, which uses the machine-learned picking sequence model locally to identify one or more items that the picker 108 should pick next.

The picker management engine 210 may use machine-learned embeddings 218 as inputs to the machine-learned picking sequence model 216. Embeddings are used to describe entities, such as items, warehouses, and pickers, in a latent space. As used herein, latent space is a vector space where each dimension or axis of the vector space is a latent or inferred characteristic of the objects (e.g., items, warehouses, and pickers) in the space. Latent characteristics are characteristics that are not observed, but are rather inferred through a mathematical model from other variables that can be observed by the relationship of between objects (e.g., users or content items) in the latent space. Advantageously, all of the available items, including already picked items and items remaining to be picked, can be described in the same latent space, e.g., using a shared layer. Items, warehouses, and pickers are generally described using different sets of latent characteristics.

For example, the items, warehouses, and pickers can all be described using a ten-dimensional vector (i.e., a vector of length 10). All of the items, which can number in at least the millions, can be described in the same 10-dimension space. All of the warehouses, which can number in at least the thousands, can be described in a different 10-dimensional space. All of the pickers, which can number in at least the tens of thousands, can be described in a third 10-dimensional space. If 1 million items are each described by ten parameters, the total number of parameters in the item embeddings will be ten million. A smaller number of parameters will be used for the warehouses and pickers, e.g., ten thousand and one hundred thousand, respectively. In other embodiments, fewer or more dimensions are used to describe one or more of the items, warehouses, and pickers.

The machine-learned embeddings 218 and the machine-learned picking sequence model 216 can both be trained using a modeling engine 220. The modeling engine 220 receives data describing prior orders picked by pickers in warehouses, and trains the machine-learned picking sequence model 216 and machine-learned embeddings 218 based on the received data. In some embodiments, the online concierge system 102 has multiple modeling engines, e.g., one modeling engine for training the picking sequence model 216, and a second modeling engine for training the embeddings 218. The modeling engine 220 may also update the embeddings 218 and the picking sequence model 216 after receiving additional data describing picking orders.

The trained item embeddings reflect the previous picking sequences. Items that are typically found in the same department tend to have similar embeddings. For example, fresh salmon and shrimp may have similar embeddings because they are usually both found at the seafood counter and will be selected near each other. Furthermore, items that are not considered as the same category, but are typically placed and selected together, may have similar embeddings. For example, cocktail sauce may have a similar embedding to shrimp because cocktail sauce is often sold at the seafood counter and purchased with shrimp. Similarly, salsa may have a similar embedding to tortilla chips. By picking up on these patterns, the trained embeddings reflect the organization of the warehouses. In fact, the trained embeddings often better reflect the warehouses' organization than explicit data describing warehouses' layouts of departments or aisles.

The embeddings for warehouses and the pickers also reflect the previous picking orders. For example, if a first warehouse shelves hummus near the dairy products, and a second warehouse shelves hummus near the deli products, on the opposite side of the store from the dairy products, this difference in organization may cause the modeling engine 220 to learn different embedding for the two warehouses. However, the embeddings will not include explicit information about the location of the hummus within the warehouses. Similarly, the embeddings for the pickers may reflect the pickers' habits. For example, if one picker typically starts with produce, while another picker typically starts with bakery products, the modeling engine 220 may learn different embeddings for these pickers.

In addition to the modeling engine 220 learning the embeddings, in some embodiments, the picker management engine 210 can receive, learn, or derive landmarks for items that indicate where a particular item can be found within a warehouse. The landmarks may be general, e.g., that cocktail sauce is typically found near shrimp, or specific, e.g., that in a particular warehouse, a particular brand of salsa is located on the shelf below to that brand of chip. Landmark data may be received directly from warehouses. In some embodiments, the picker management engine 210 derives landmarks for items from embeddings; for example, if an embedding for a first product is very similar to a second product, the second product may be determined to be a landmark for the first product. In some embodiments, the picker management engine 210 identifies items that pickers 108 generally have difficulty finding, and then determines a landmark based on the embeddings for those items and related items. The picker management engine 210 can provide landmark data to pickers 108 as clues for where to look. The picker management engine 210 may transmit the landmark data to the picker mobile application 112 automatically or in response to a request for a landmark.

Figure 3A:
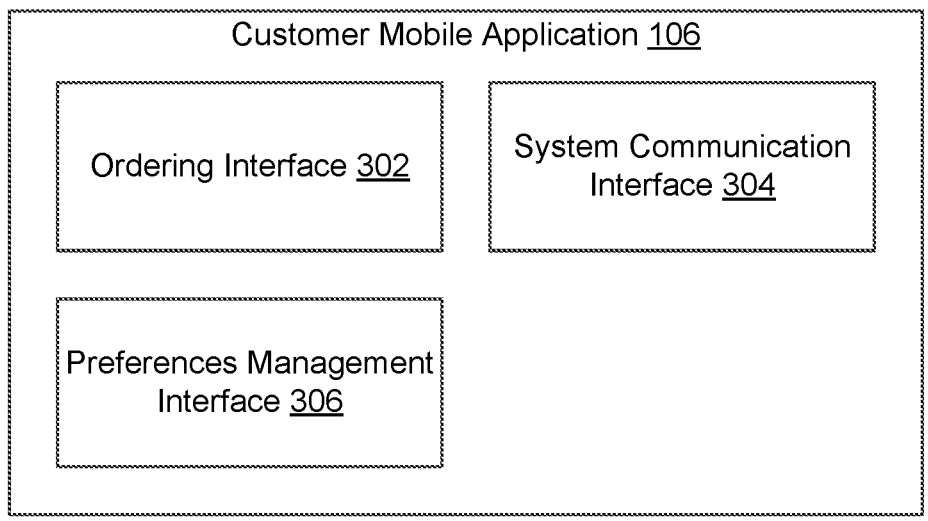
FIG. 3A is a diagram of a customer mobile application (CMA) 106, according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Figure 3B:
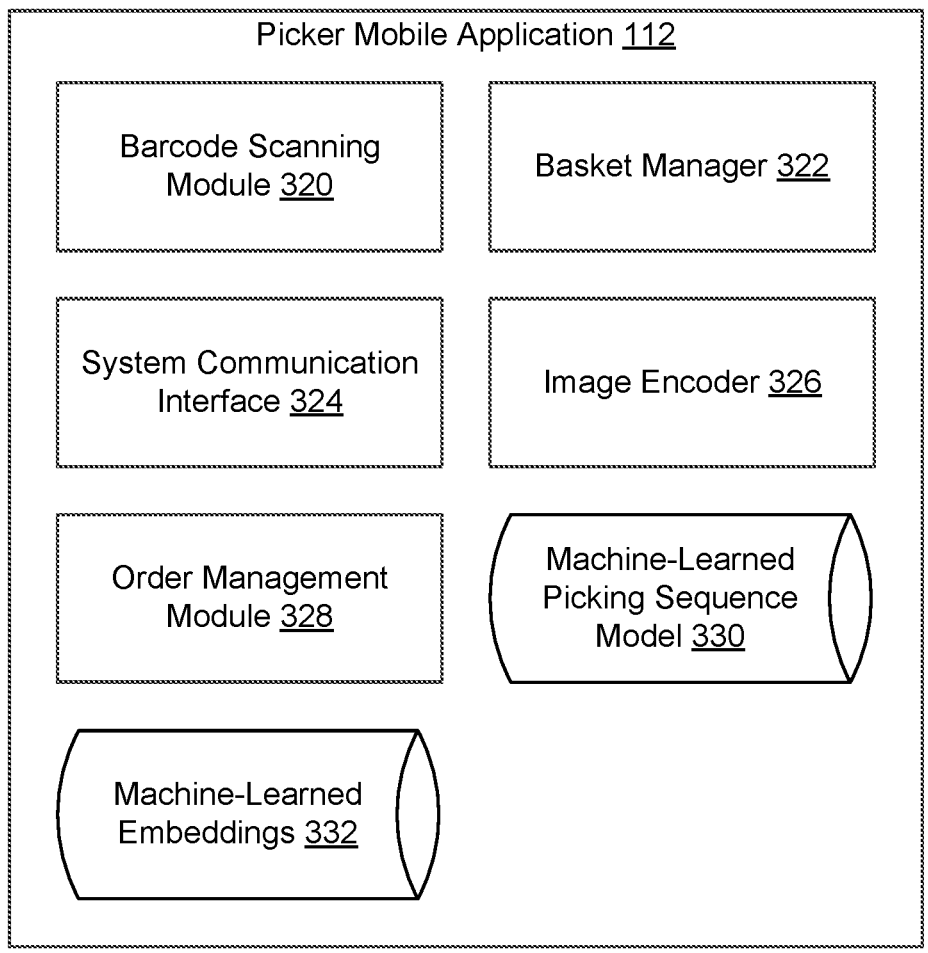
FIG. 3B is a diagram of a picker mobile application (PMA) 112, according to one embodiment.

FIG. 3B is a diagram of the picker mobile application (PMA) 112, according to one embodiment. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

The PMA 112 also includes a system communication interface 324, which interacts with the online concierge system 102. For example, the system communication interface 324 receives an order from the online concierge system 102 and transmits the contents of a basket of items to the system 102.

The PMA 112 includes an order management module 328, which organizes and displays the items in an optimized picking sequence to the picker 108. In an embodiment, the order management module 328 displays the full list of items to the picker 108, or as many items as fit on a screen. The full list of items may be provided in an optimized picking sequence, or the order management module 328 may highlight one or several predicted next items, without sequencing the remaining items. The order management module 328 may highlight the predicted next item(s) by placing them at the top of the list or visually distinguishing them. In another embodiment, the order management module 328 only displays the predicted next item, or a subset of items with high predictions, to the picker 108. The PMA 112 may also display clues or landmarks to a picker 108 along with the items automatically, or in response to a request from the picker 108.

In one embodiment, the system communication interface 324 receives a list of items and a sequence for the items determined by the picker management engine 210 using the picking sequence model 216. The order management module 328 lists the items according to the determined sequence as a suggestion to the picker 108, but the picker 108 picks in the order that the picker 108 deems suitable. The order management module 328 does not shuffle the items during picking, which avoids confusing the picker 108. This embodiment provides autonomy to the picker 108 while assisting the picker 108 in improving picking efficiency.

In one embodiment, the system communication interface 324 transmits real-time basket updates to the online concierge system 102, and the picker management engine 210 determines the next item for picking, or a sequence of next items, using the machine-learned picking sequence model 216. The picker management engine 210 then transmits the next item or sequence of items to the PMA 112, and the order management module 328 displays the next item(s) to the picker 108. This embodiment may be suitable when the PMA 112 has a consistent network connection to the online concierge system 102 and the PMA 112 is able to quickly transmit data to and receive data from the online concierge system 102. Further, this embodiment may be suitable when it is desirable to break up the list into single items or small groups which can are predicted to be efficiently picked, e.g., if the list of items is long, or less picker autonomy is desired.

In another embodiment, the system communication interface 324 receives the machine-learned picking sequence model 216 from the online concierge system 102, and the PMA 112 locally stores the model as machine-learned picking sequence model 330. In such embodiments, the order management module 328 uses the local machine-learned picking sequence model 330 to determine the next item or a sequence of items. The system communication interface 324 may also receive all or a subset of the machine-learned embeddings 218 from the online concierge system 102 and locally store the received embeddings as machine-learned embeddings 332. For example, the machine-learned embeddings 332 may include the embedding for the picker 108, the embedding for the warehouse 110 at which the picker 108 is picking items, and the embeddings for the items in a particular order or set of orders assigned to the picker 108. This embodiment may be suitable when the PMA 112 has an unstable network connection (e.g., if a smartphone executing the PMA 112 has poor reception within a warehouse 110) and has sufficient memory and processing power to store and execute the machine-learned picking sequence model 330.

Sequencing Orders for Picking

FIG. 4 illustrates a list of items in a customer order 400 and a picked sequence 450 showing the sequence in which the items were picked by a picker 108. The PMA 112 can display the customer order 400 to a picker 108 using the order management module 328. The picker 108 then picks the items in a particular warehouse 110. After picking each item, the picker 108 scans the item using the barcode scanning module 320 of the PMA 112, which transmits an identifier of each picked item to the online concierge system 102. The online concierge system 102 stores the picked sequence 450 in the picker database 212.

The picked sequence 450 indicates that the picker 108 first picked produce items (items 1-3), followed by bakery items (items 4 and 5), pantry items (items 6-8), meat (item 9), and frozen food (item 10) in a particular warehouse 110. The picked sequence 450 also reflects the order in which items within each section were picked. While pickers cannot always find items, and do not always pick items in the most efficient manner, in the aggregate, actual picked sequences such as picked sequence 450 are useful for training a model that can predict an efficient picking order for a particular set of items from a particular warehouse. In fact, a model that is based on analysis of many picked sequences, across many pickers and warehouses, can outperform models that are based on the actual distances between products, such as traveling salesman solutions. In addition, a machine learning model that is based on picked sequences can be generated without any prior information about a warehouse layout, which can be difficult to obtain.

FIG. 5A illustrates a list of items of an order in progress 500 and a suggested item for picking next generated using a picking sequence model 216, according to one embodiment. The order in progress 500 include a list of picked items 510 and a list of remaining items 520. The list of picked items 510 indicates that the picker has picked bananas, grapes, and a tomato. The remaining items 520 include salmon, celery, fresh orange juice, ice cream, frozen pizza, and a carton of eggs. The picker management engine 210 or the order management module 328 uses the machine-learned picking sequence model 216 or 330 to determine, based on data (e.g., embeddings 218 or 332) describing the picked items 510, the remaining items 520, and the warehouse, the likelihoods that a picker 108 would pick each of the remaining items 520, and select the most likely item as the next item suggested for picking 530. In this case, the picking sequence model indicates that fresh orange juice is the most likely item to be picked next, and therefore selects the fresh orange juice as the next item suggested for picking 530. This selection may reflect that the fresh orange juice is located in the produce section, rather than in the dairy section near the pasteurized juices, in the warehouse in which the picker is picking the items. However, the picking sequence model can determine that the fresh orange juice 530 should be selected next without knowledge of where the items are actually located within the warehouse. The order management module 328 can provide the next item suggested for picking 530 to the picker 108. After the picker 108 picks the next item (the fresh orange juice, or a different item as decided by the picker 108) and adds it to the basket, the picker management engine 210 or the order management module 328 can re-compute the next item based on the remaining items.

In some embodiments, the picker management engine 210 or the order management module 328 uses the picking sequence module 216 or 330 to sort the full list of items, e.g., by identifying the most likely item to be picked first, and then assuming that item is picked first, identifying the following most likely next item from the remaining items, etc. An example of a list of items in a received order 550 and a suggested picking sequence for the full order 560 is shown in FIG. 5B. In this example, the picker management engine 210 or the order management module 328 has determined that the frozen pizza should be picked first, followed by the ice cream, salmon, etc. In this embodiment, the order management module 328 provides the full suggesting picking sequence 560 to the picker 108.

Predictive Model for Optimizing a Picking Sequence

Figure 6:
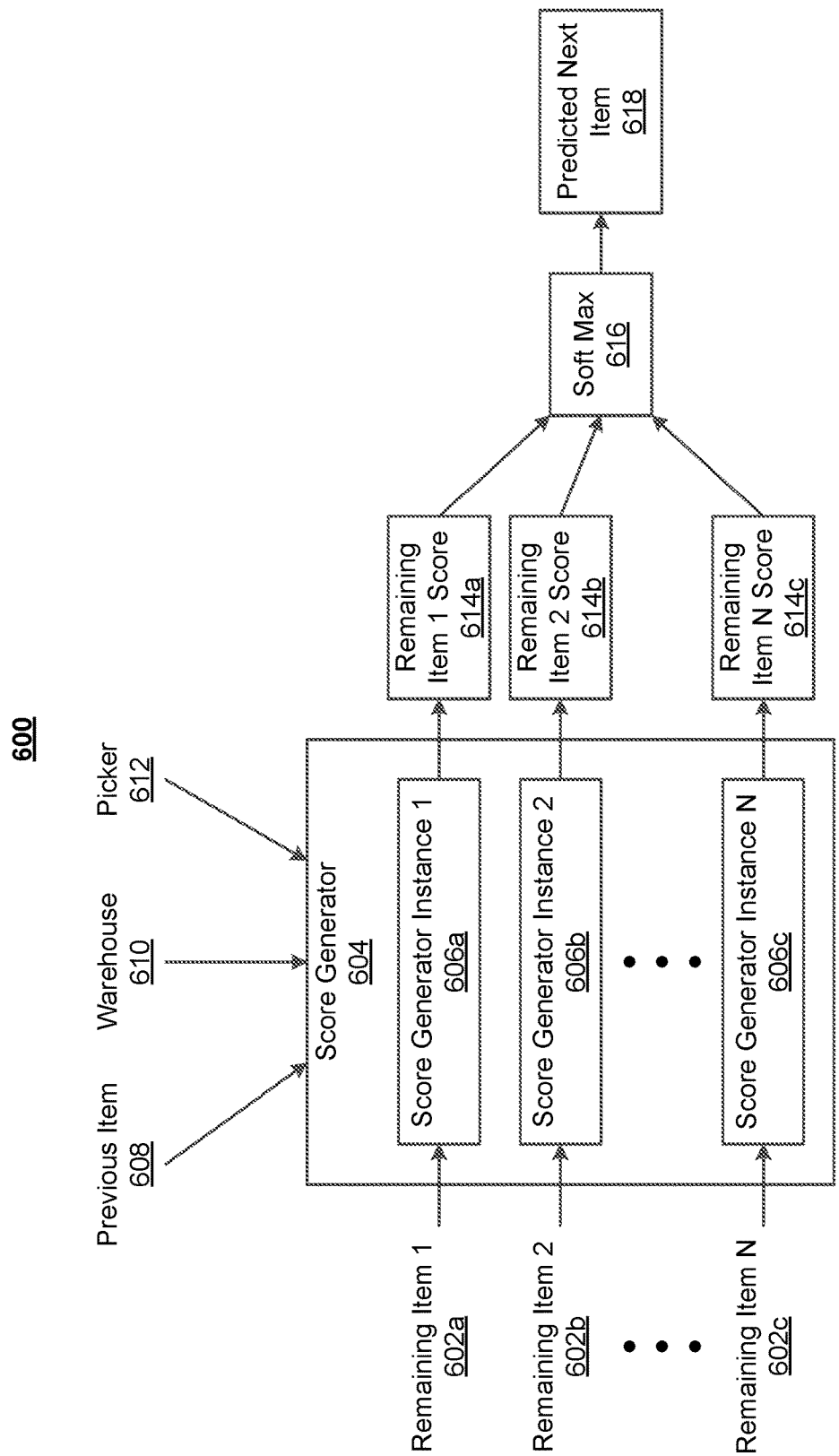
FIG. 6 is a block diagram of a process for predicting a next item to pick using a machine learned model, according to one embodiment.

FIG. 6 is a block diagram of a process 600 used to predict a next item to pick using a machine learned model, according to one embodiment. The process 600 can be performed by the picker management engine 210, or the process 600 can be performed by the order management module 328 if the PMA 112 has a local version of the picking sequence model 330. The process 600 receives as an input a list of N remaining items (e.g., the remaining items 520), which includes remaining item 1 602a through remaining item N 602c. The process 600 also receives as inputs information identifying the previous item 608 (e.g., the predicted next item from a previous iteration of the process 600, or, if the process 600 is running in real time as the picker picks items, an item that was already picked by the picker), the warehouse 610 in which the picker is picking items, and, in some embodiments, the picker 612. The inputs 608-612 may be embeddings describing the items, picker, and warehouse, or the process 600 may involve retrieving embeddings describing the items, picker, and warehouse from the database of machine-learned embeddings 218 or 332 based on the inputs 608-612.

The data for the remaining items 602a-602c, previous item 608, warehouse 610, and picker 612 is input into a score generator 604, which calculates a remaining item score 614 for each remaining item 602. In some embodiments, the score generator 604 receives one or more additional inputs, such as time of day, day of week, retailer identifier, additional warehouse information (e.g., layout information), and additional product information (e.g., brand, description, category). The score generator 604 uses the machine-learned picking sequence model 216 or 330 to calculate the remaining item scores 614a-614c. In particular, the score generator 604 executes multiple score generator instances 606a-606c, each of which utilizes the same machine-learned picking sequence model 216 or 330, to calculate each remaining item score 614. Each score generator instance 606 calculates a remaining item score 614 for a unique remaining item; for example, score generator instance 1 606a calculates the remaining item 1 score 614a for the remaining item 1 602a. An identical score generator 606 is used to score all of the remaining items 602a-602c. The details of one score generator instance 606 are shown in FIG. 7.

The calculated remaining item scores 614a-614c output by the score generator 604 are optionally scaled by a softmax function 616. A softmax function is often used as a final layer in a neural-network based classifier; here, the softmax function 616 is used to highlight the highest remaining item score 614. The remaining item 602 having the highest softmax score is selected as the predicted next item 618. To use the process 600 to generate a sequence of items, the predicted next item 618 can be fed back into the process 600 as the previous item 608, the predicted next item 618 is removed from the remaining items 602, and the process 600 selects another predicted next item 618 based on the updated inputs.

To select a first item from a list of items, a slightly modified version of the process 600 can be used. For the first item, there will be no previous item 608, and all of the items in the list will be input to the score generator 604 as remaining items 602. In some embodiments, a different picking sequence model is trained and used to generate the scores for the first item; in other embodiments, the same picking sequence model is used, and an input the score generator 604 indicates that the first item is being predicted.

Figure 7:
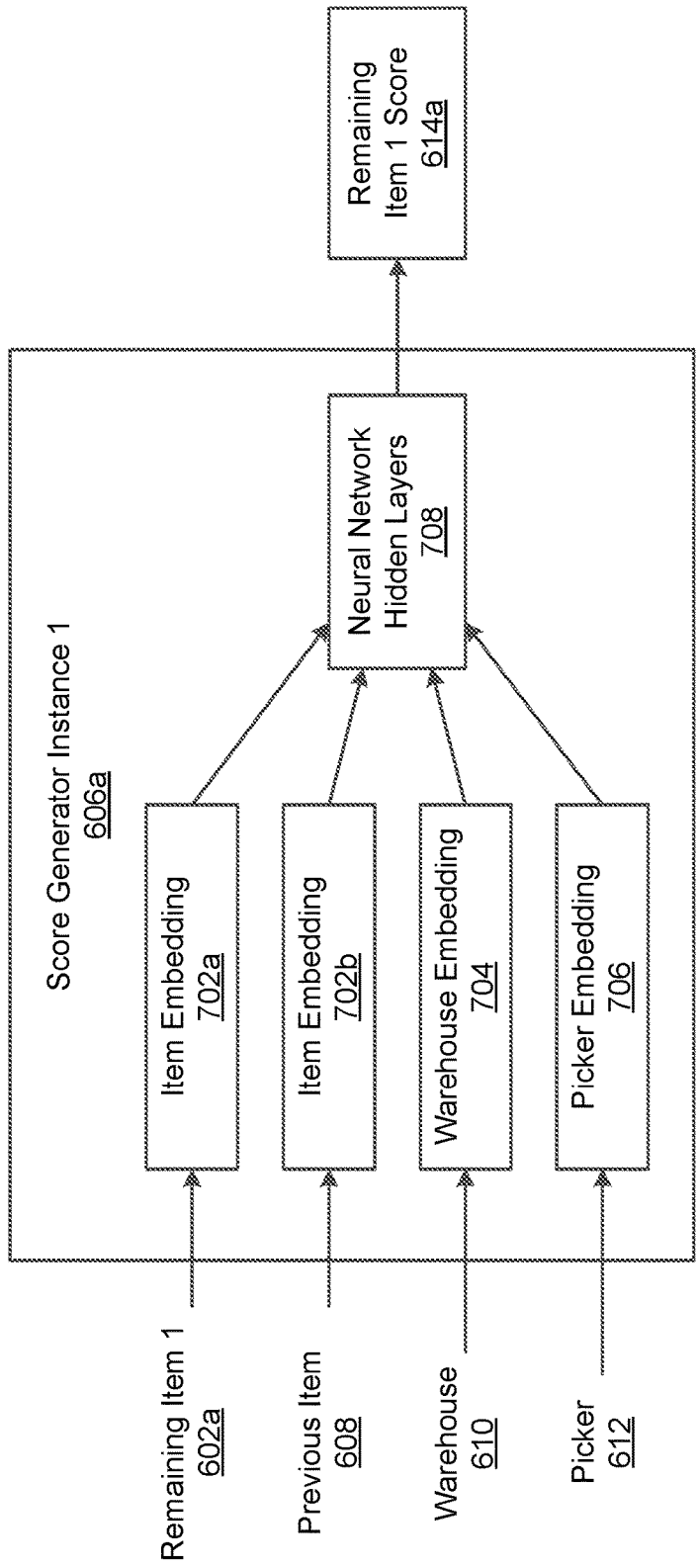
FIG. 7 is a block diagram showing the score generator used in the process shown in FIG. 6, according to one embodiment.

FIG. 7 is a block diagram 700 showing an instance of the score generator 604 in the process 600 shown in FIG. 6, according to one embodiment. In this example, the block diagram 700 shows score generator instance 1 606a, which calculates the remaining item 1 score 614a for remaining item 1 602a. Score generator instance 1 606a receives as inputs identifiers for remaining item 1 602a, the previous item 608 that was predicted or picked, the warehouse 610, and the picker 612. In the example of FIG. 5A, the remaining item 1 602a is salmon, and the previous item 608 was a tomato. The score generator instance 1 606a retrieves an item embedding 702a describing the remaining item 1 602a (e.g., the salmon) from the machine learned embeddings 218 (if the process 600 is executed by the online concierge system 102) or the machine learned embeddings 330 (if the process 600 is executed by the PMA 112). The score generator instance 1 606a similarly retrieves another item embedding 702a for the previous item 608 (e.g., the tomato), a warehouse embedding 704 for the warehouse 610 in which the picker is selecting items, and a picker embedding 706 describing the picker 612.

In one embodiment, the score generator instance 1 606a receives additional inputs identifying one or more additional already-picked items, picked before the last-picked item 608. In the example of FIG. 5, the score generator instance 1 606a (and the other score generators also shown in FIG. 6) may receive identifiers of the bunch of grapes and the bunch of bananas. In this embodiment, the score generator instance 1 606a also retrieves any additional embeddings for any additional picked items. If the score generator instance 1 606a is calculating a remaining item score 614a for a first item, before any items have been predicted or picked, then no previous item 608 is input into the score generator instance 1. Instead, an indication that the first item is being predicted may be input to the score generator instance 606a.

The embeddings 702a, 702b, 704, and 706 (or 702a, 704, and 706, if the score is being generated to predict the first item) are input to a set of neural network hidden layers 708. In one embodiment, the embeddings 702a, 702b, 704, and 706 (e.g., four 10-dimensional vectors) are first merged together to form a single vector (e.g., a single 40-dimensional vector), which is input to the hidden layers 708. Although the number of parameters describing the embeddings is large (e.g., over 10 million, as described above), the total vector size being operated on within each score generator instance 606 is relatively small. The neural network hidden layers 708 are an example of the machine-learned picking sequence model 216 or 330. As described with respect to FIG. 8, the neural network hidden layers 708 are trained on data describing previous picking sequences.

The output of the neural network hidden layers 708 is the remaining item 1 score 614a, which reflects a likelihood that remaining item 1 602a would be picked next. The remaining item score 614a for remaining item 1 602a is compared to other scores 614b-614c for the other remaining items to determine, of all of the remaining items, which item is most likely to be picked next. If the picker 612 is used as an input to the score generator 604, the neural network hidden layers 708 output the probability that the picker 612 would pick a remaining item 602 next. In another embodiment, the picker 612 is not input to the score generator 604, and the output of the neural network hidden layers 708 outputs a probability that an optimal picker would pick a remaining item 602 next. While an optimal picker picking according to the optimized sequence may pick the items the fastest, individual pickers may have different habits from the optimal picker, so optimizing a sequence for a particular picker's behaviors or habits may provide superior results for that particular picker.

In the example of FIG. 5A, the remaining item 1 score 614a for the salmon would be relatively low if the salmon is unlikely to be picked next after the tomato. This could be because salmon is not located near tomatoes generally or in the particular warehouse 610, because the picker 612 routinely picks fresh meat and seafood last, or some other factor or combination of factors. The remaining item scores for the fresh orange juice, which is suggested for picking next and may be in the produce department, or the celery, which is also in the produce department, would likely be higher than the remaining item score 614a for the salmon. Thus, score generator 604 may output high values for the celery and the orange juice, and relatively lower values for the eggs, salmon, ice cream, and frozen pizza.

In some embodiments, additional data is fed into each score generator instance 606. For example, if data about a warehouse's layout, e.g., aisle information or department metadata, is available, this information can also be used to calculate the remaining item scores 614. In one embodiment, in addition to retrieving the item embeddings 702 for the remaining item and last-picked item, the score generator instance 604 retrieves aisle or department information for each item, and inputs this information into the neural network hidden layers 708. In this embodiment, the neural network hidden layers 708 have been previously trained using this additional information.

Process for Training the Picking Sequence Model

Figure 8:
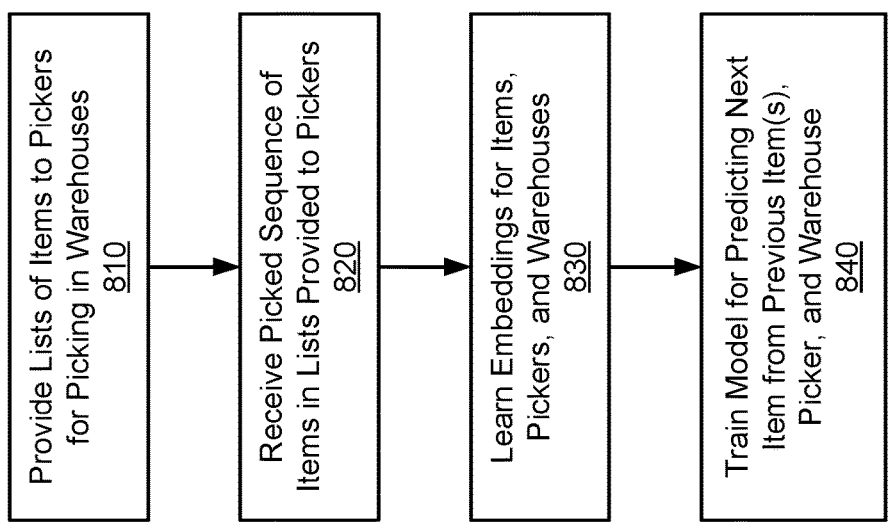
FIG. 8 is a flowchart illustrating a process of training a model for predicting the next item to be picked, according to one embodiment.

FIG. 8 is a flowchart illustrating a process 800 of training a model for predicting the next item to be picked, according to one embodiment. The online concierge system 102 provides 810 different lists of items to pickers for picking across different warehouses. The lists may be sorted in some order, e.g., alphabetically or by department, and the full lists are given to the pickers. This way, the online concierge system 102 can observe the picking patterns of the pickers. The lists may be displayed to the pickers via the PMA 112, and the pickers use the PMA 112 to track the progress of their picking, e.g., using the barcode scanning module 320 to add each picked item to their basket.

The online concierge system 102 then receives 820 the picked sequence of items in the lists that were provided to the pickers. The picked sequences can include an ordered list of item identifiers. Some or all of the picked sequences may also include a time at which each item was picked, or a measure of time between picking subsequent items. In some embodiments, pickers may also provide additional information regarding their picking, such as items they had difficulty finding or suitable landmarks for items.

The online concierge system 102 (e.g., the modeling engine 220) learns 830 the embeddings for the items, the warehouses, and in some embodiments, the pickers based on the received picked sequences. As described with respect to FIG. 2, the embeddings for the items reflect the order in which the items tend to be picked. The embeddings for the warehouses may reflect a structure or organization of the warehouse, and the embeddings for the pickers may reflect the habits of the pickers.

If the times or time gaps are obtained along with the received picked sequences, the modeling engine 220 may also use the time information to learn the embeddings. For example, if one item is routinely picked very soon after another item, this indicates that the items are located near each other, and that the picker was picking efficiently. In some embodiments, the online concierge system 102 can use items that are routinely picked near each other in time to learn a landmark for each item. The landmark can be learned for a particular warehouse or across many or all warehouses. As another example, if there is routinely a large time gap between two items, or sets of items with similar embeddings, the modeling engine 220 may infer that these items or groups of items are not located near each other. In other examples, a large time gap may indicate that a picker is not operating efficiently, got distracted, had difficulty finding an item, or encountered some other issue.

The online concierge system 102 (e.g., the modeling engine 220) also trains 840 the model for predicting the next item that would be picked based on the previous item or items, the picker, and the warehouse. The modeling engine 220 can train the machine-learned picking sequence model 216 using standard machine learning techniques for neural networks. For example, the modeling engine 220 may determine the weights of the picking sequence model 216, e.g., the weights of edges of the neural network corresponding to the model. In other embodiments, the modeling engine 220 may train the picking sequence model 216 using tree-based methods, kernel methods, splines, or an ensemble of one or more of these techniques. The modeling engine 220 may train the embeddings 218 and the picking sequence model 216 jointly, or the modeling engine 220 may train one of the embeddings 218 or the picking sequence model 216 first, and use the results of one in training the other.

Process for Predicting a Next Item to Pick

Figure 9:
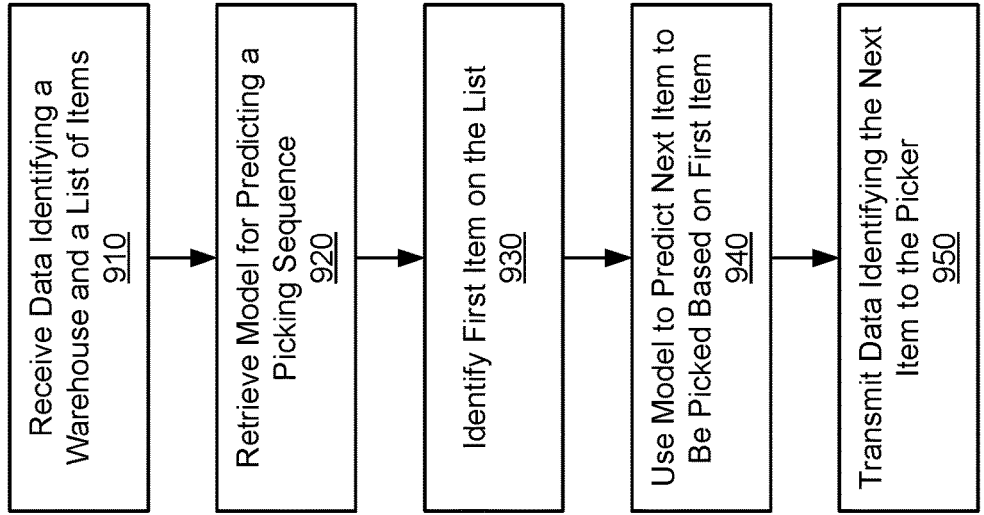
FIG. 9 is a flowchart illustrating a process for predicting a next item to be picked using the trained model, according to one embodiment.

FIG. 9 is a flowchart illustrating a process 900 for predicting a next item to be picked using the trained model, according to one embodiment. The process may be carried out by the online concierge system 102, the PMA 112, or a combination of the online concierge system 102 and the PMA 112. The online concierge system 102 or the PMA 112 receives 910 data identifying a warehouse and a list of items. The list of items was selected by a customer 104, and the warehouse may have been specified by the customer 104, or determined by the online concierge system 102.

The online concierge system 102 or the PMA 112 retrieves 920 a model for predicting a picking sequence. In particular, the online concierge system 102 retrieves the machine-learned picking sequence model 216, or the PMA 112 retrieves the picking sequence model 330.

The online concierge system 102 or the PMA 112 identifies 930 a first item on the list. The online concierge system 102 or the PMA 112 may identify the first item by predicting the first item of the list of items to pick using the picking sequence model. Alternatively, the first item may be an item that was picked by a picker 108, identified after being scanned by the barcode scanning module 320 and added to the basket by the basket manager 322.

The online concierge system 102 or PMA 112 predicts 940 the next item on the list to be picked based on the first item using the machine-learned picking sequence model. The operation of the picking sequence model is described with respect to FIGS. 6 and 7.

The online concierge system 102 or PMA 112 transmits 950 data identifying the next item to the picker. If the online concierge system 102 predicts the next item, the online concierge system 102 transmits the data identifying the next item to the PMA 112. If the online concierge system 102 or PMA 112 predicted the first item at 930, it may also transmit data identifying the first item to the picker. In some embodiments, the PMA 112 displays the next item to the picker along with one or more additional items, and/or displays a landmark or other clue for finding the next item.

Process for Predicting a Sequence of Items to Pick

Figure 10:
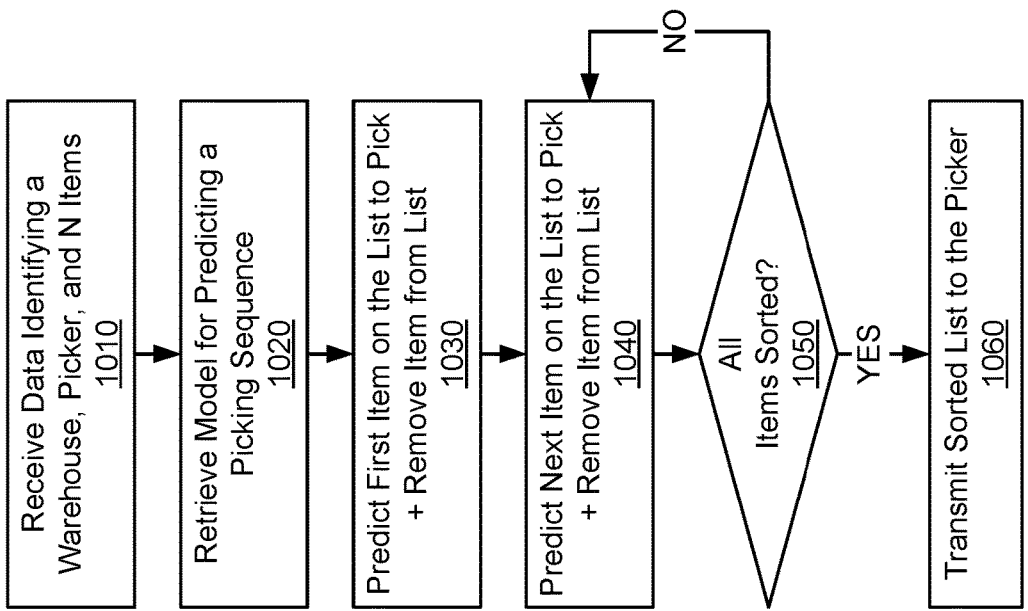
FIG. 10 is a flowchart illustrating a process for sorting a full list of items to be picked using the trained model, according to one embodiment.

FIG. 10 is a flowchart illustrating a process 1000 for sorting a full list of items to be picked using the trained model, according to one embodiment. The process 1000 is described as being carried out by the online concierge system 102; however, in other embodiments, one or more steps may be carried out by the PMA 112 or a combination of the online concierge system 102 and the PMA 112. The online concierge system 102 receives 1010 data identifying a warehouse, a picker, and a list of N items. The list of items was selected by a customer 104, the warehouse may have been specified by the customer 104 or determined by the online concierge system 102, and the picker 108 was determined by the online concierge system 102.

The online concierge system 102 retrieves 1020 a model for predicting a picking sequence. In particular, the online concierge system 102 retrieves the machine-learned picking sequence model 216.

The online concierge system 102 predicts 1030 the first item of the items on the list to pick, and removes the predicted first item from the list. The online concierge system 102 predicts the first item using a machine-learned picking sequence model, as described with respect to FIGS. 6 and 7. The first item is removed from the list so that the remaining items (i.e., the received list of N items with the predicted first item removed) can be sorted.

The online concierge system 102 then predicts 1040 the next item on the list to be picked based on the first item, and removes the predicted next item from the list. The online concierge system 102 predicts the next item using a machine-learned picking sequence model, as described with respect to FIGS. 6 and 7. The next item is removed from the list so that the remaining items can be sorted.

The online concierge system 102 determines 1050 whether all items in the list have been sorted, i.e., whether any items remain in the list of items to be sorted. For example, the online concierge system 102 determines whether only one item is remaining in the list; if only one item is remaining, this item is assigned to the last place in the sequence, and all items have been sorted. If not all items have been sorted, the process 1000 proceeds to predict 1040 the next item.

If all of the items in the list have been sorted, the online concierge system 102 transmits 1060 the sorted list to the picker 108. For example, the online concierge system 102 can transmit the sorted list to the PMA 112, which displays the sorted list as a suggested picking sequence to the picker 108.

Process for Updating the Predictive Model

Figure 11:
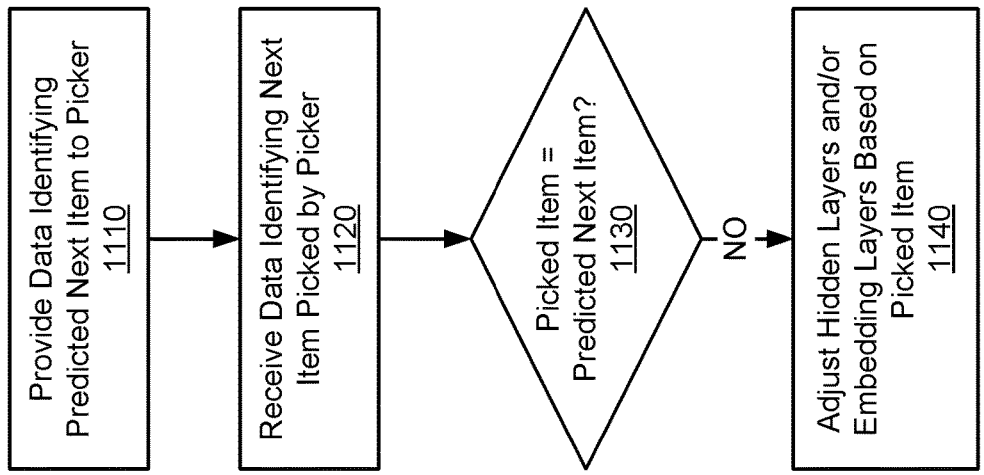
FIG. 11 is a flowchart illustrating a process of updating a model for predicting the next item to be picked, according to one embodiment.

FIG. 11 is a flowchart illustrating a process of updating a model for predicting the next item to be picked, according to one embodiment. The PMA 112 provides 1110 data identifying the predicted next item to the picker. If the online concierge system 102 predicts the next item, the online concierge system 102 transmits the data identifying the next item to the PMA 112, which displays the next item to the picker, along with at least one additional item on the list. In some embodiments, the predicted next item may be provided as part of a fully sorted picking sequence, e.g., the picking sequence determined using the process 1000.

The online concierge system 102 receives 1120 data identifying the next item picked by the picker. The picker may have picked the predicted next item, or skipped the predicted next item and picked a different item. Thus, the data identifying the next item picked may identify the predicted next item, or a different item included further down the list of items.

The online concierge system 102 compares 1130 the data identifying the next item picked to the predicted next item to determine whether the picker picked the predicted next item. If the picker did pick the predicted next item, the online concierge system 102 may provide data identifying the predicted next item to the picker (if the online concierge system 102 provides a new prediction after each picked item), and continue monitoring the items picked by the picker.

If the picker picked a different item from the predicted next item, the online concierge system 102 (e.g., the modeling engine 220) adjusts 1040 the hidden layers (e.g., the neural network hidden layers 708) and one or more embedding layers (e.g., one or more of the embeddings 218) to improve the model and/or the embeddings to better reflect current picker behavior or layouts. In some embodiments, the online concierge system 102 inputs the predicted next item and picked next item into a cross entropy loss function, which generates any needed updates for the picking sequence model 216 and/or embeddings 218. As warehouse layouts change due to reorganization or introduction or removal of items, the modeling engine 220 responds to these changes by updating the picking sequence model 216 and embeddings 218 for the items, the warehouse, and/or the picker.

In another embodiment, the online concierge system 102 does not adjust the picking sequence model 216 or embeddings 218 after each pick, but instead receives completed picking sequences from PMAs 112, and adjusts the hidden layers and/or embeddings based on the picked sequences at periodic intervals, e.g., once per day or once per week. The online concierge system 102 can periodically generate a new model 216 and/or new embeddings 218. If the PMA 112 stores locally a picking sequence model 330 and embeddings 332, the online concierge system 102 may periodically transmit an updated model and embeddings to the PMA 112.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable medium storing parameters for a machine-learning model that predicts a next item to be picked of a plurality of items, wherein the machine-learning model is produced by a process comprising:
    accessing a plurality of training examples, each training example comprising a list of candidate items;
    initializing a plurality of weights for the machine-learning model;
    training the machine-learning model based on each of the plurality of training examples, and wherein training the machine-learning model on a training example comprises:
        transmitting the list of candidate items of the training example to a picker device associated with a picker of the plurality of pickers;
        receiving, from the picker device, a picking sequence for the list of candidate items, wherein the picking sequence indicates a sequence in which the picker picked the list of candidate items;
        retraining the machine-learning model based on the picking sequence by, for a subject item in the picking sequence:
            inputting, to the machine-learning model, a list of previously-picked items in the picking sequence and an embedding for each unpicked item in the picking sequence to generate a prediction score for each unpicked item in the picking sequence, wherein a prediction score for each unpicked item represents a likelihood that the corresponding unpicked item is picked next by the picker;

comparing the prediction score for each unpicked item to the subject item in the picking sequence; and updating the plurality of weights for the machine-learning model based on the comparison; and storing a final plurality of weights for the machine-learning model to the non-transitory computer-readable medium.

2. The non-transitory computer-readable medium of claim 1, wherein each training example of the plurality of training examples further comprises an identifier for a picker who picked the list of candidate items, and wherein retraining the machine-learning model comprises:

inputting an embedding for the picker to the machine-learning model to generate the prediction score.

3. The non-transitory computer-readable medium of claim 1, wherein each training example of the plurality of training examples further comprises an identifier for a warehouse in which the list of items was picked, and wherein retraining the machine-learning model comprises:

inputting an embedding for the warehouse to the machine-learning model to generate the prediction score.

4. The non-transitory computer-readable medium of claim 1, wherein the process further comprises:

generating the plurality of training examples based on orders placed by users of an online system and serviced by pickers of the online system.

5. The non-transitory computer-readable medium of claim 1, wherein comparing the prediction score for each unpicked item to the item comprises:

computing a loss score based on the prediction score for the item and the prediction scores of other unpicked items.

6. A method comprising:

accessing the non-transitory computer-readable medium of claim 1;

applying the machine-learning model whose parameters are stored on the non transitory computer-readable medium.

7. The method of claim 6, further comprising:

receiving a set of items from a user of an online system;

predicting a next item for a picker to pick by applying the machine-learning model to embeddings for each of the set of items; and transmitting a notification to a client device of the picker indicating the next item to pick.

8. A method comprising:

accessing a plurality of training examples, each training example comprising a list of candidate items;

initializing a plurality of weights for a machine-learning model;

training the machine-learning model based on each of the plurality of training examples, and wherein training the machine-learning model on a training example comprises:

transmitting the list of candidate items of the training example to a picker device associated with a picker of the plurality of pickers;

receiving, from the picker device, a picking sequence for the list of candidate items, wherein the picking sequence indicates a sequence in which the picker picked the list of candidate items;

retraining the machine-learning model based on the picking sequence by, for a subject item in the picking sequence:

inputting, to the machine-learning model, a list of previously-picked items in the picking sequence and an embedding for each unpicked item in the picking sequence to generate a prediction score for each unpicked item in the picking sequence, wherein a prediction score for each unpicked item represents a likelihood that the corresponding unpicked item is picked next by the picker;

comparing the prediction score for each unpicked item to the subject item in the picking sequence; and updating the plurality of weights for the machine-learning model based on the comparison; and storing a final plurality of weights for the machine-learning model to a non-transitory computer-readable medium.

9. The method of claim 8, wherein each training example of the plurality of training examples further comprises an identifier for a picker who picked the list of candidate items, and wherein retraining the machine-learning model comprises:

inputting an embedding for the picker to the machine-learning model to generate the prediction score.

10. The method of claim 8, wherein each training example of the plurality of training examples further comprises an identifier for a warehouse in which the list of items was picked, and wherein retraining the machine-learning model comprises:

inputting an embedding for the warehouse to the machine-learning model to generate the prediction score.

11. The method of claim 8, further comprising:

generating the plurality of sets of training data based on orders placed by users of an online system and serviced by pickers of the online system.

12. The method of claim 8, wherein comparing the prediction score for each unpicked item to the item comprises:

computing a loss score based on the prediction score for the item and the prediction scores of other unpicked items.

13. The method of claim 8, further comprising:

applying the machine-learning model.

14. The method of claim 13, further comprising:

receiving a set of items from a user of an online system;

predicting a next item for a picker to pick by applying the machine-learning model to embeddings for each of the set of items; and transmitting a notification to a client device of the picker indicating the next item to pick.

15. A non-transitory computer-readable medium storing instructions that, when executed by a processor, cause the processor to perform operations comprising:

accessing a plurality of training examples, each training example comprising a list of candidate items and a picking sequence in which the items in the list of candidate items were picked;

initializing a plurality of weights for a machine-learning model;

training the machine-learning model based on each of the plurality of training examples, and wherein training the machine-learning model on a training example comprises:

transmitting the list of candidate items of the set of training data to a picker device associated with a picker of the plurality of pickers;

receiving, from the picker device, a picking sequence for the list of candidate items, wherein the picking sequence indicates a sequence in which the picker picked the list of candidate items;

retraining the machine-learning model based on the picking sequence by, for a subject item in the picking sequence:
  inputting, to the machine-learning model, a list of previously-picked items in the picking sequence and an embedding for each unpicked item in the picking sequence to generate a prediction score for each unpicked item in the picking sequence, wherein a prediction score for each unpicked item represents a likelihood that the corresponding unpicked item is picked next by the picker;
  comparing the prediction score for each unpicked item to the subject item in the picking sequence; and
  updating the plurality of weights for the machine-learning model based on the comparison; and
storing a final plurality of weights for the machine-learning model to a non-transitory computer-readable medium.

16. The non-transitory computer-readable medium of claim 15, wherein each training example of the plurality of training examples further comprises an identifier for a picker who picked the list of candidate items, and wherein retraining the machine-learning model comprises:
  inputting an embedding for the picker to the machine-learning model to generate the prediction score.

17. The non-transitory computer-readable medium of claim 15, wherein each training example of the plurality of training examples further comprises an identifier for a warehouse in which the list of items was picked, and wherein retraining the machine-learning model comprises:
  inputting an embedding for the warehouse to the machine-learning model to generate the prediction score.

18. The non-transitory computer-readable medium of claim 15, wherein the operations further comprise:
  generating the plurality of sets of training data based on orders placed by users of an online system and serviced by pickers of the online system.

19. The non-transitory computer-readable medium of claim 15, wherein comparing the prediction score for each unpicked item to the item comprises:
  computing a loss score based on the prediction score for the item and the prediction scores of other unpicked items.

20. The non-transitory computer-readable medium of claim 15, the operations further comprising:
  receiving a set of items from a user of an online system;
  predicting a next item for a picker to pick by applying the machine-learning model to embeddings for each of the set of items; and
  transmitting a notification to a client device of the picker indicating the next item to pick.

* * * * *